(12) United States Patent
Guider

(10) Patent No.: US 9,422,115 B1
(45) Date of Patent: *Aug. 23, 2016

(54) CONVEYOR SYSTEM

(71) Applicant: Amazon Technologies, Inc., Seattle, WA (US)

(72) Inventor: Andrew Scott Guider, Chattanooga, TN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,824

(22) Filed: Feb. 9, 2015

Related U.S. Application Data

(63) Continuation of application No. 13/899,865, filed on May 22, 2013, now Pat. No. 8,978,871.

(51) Int. Cl.
*B65G 47/88* (2006.01)
*B65G 37/00* (2006.01)
*B65G 13/00* (2006.01)
*B65G 39/07* (2006.01)
*B65G 67/08* (2006.01)

(52) U.S. Cl.
CPC .............. *B65G 37/00* (2013.01); *B65G 13/00* (2013.01); *B65G 39/07* (2013.01); *B65G 47/883* (2013.01); *B65G 67/08* (2013.01)

(58) Field of Classification Search
CPC .... B65G 39/07; B65G 67/08; B65G 47/883; B65G 47/8807
USPC ........................ 198/419.1, 343.1; 414/331.17
See application file for complete search history.

(56) References Cited

U.S. PATENT DOCUMENTS

| | | | | |
|---|---|---|---|---|
| 3,827,585 A * | 8/1974 | McWilliams | .......... | B65G 67/08 198/587 |
| 3,894,627 A * | 7/1975 | Jabbusch | ................ | B65B 35/44 198/461.1 |
| 3,986,605 A * | 10/1976 | Dooley | ................ | B65G 47/265 198/746 |
| 4,595,092 A * | 6/1986 | Dyer | ...................... | B65G 47/82 198/456 |
| 6,652,218 B1 * | 11/2003 | Eggebrecht | ............... | B07C 1/04 198/468.1 |
| 6,799,933 B1 * | 10/2004 | Wasinger | ............. | B65D 88/129 414/352 |
| 8,027,616 B2 | 9/2011 | Mori | | |
| 8,205,738 B1 * | 6/2012 | Fourney | ............. | B65G 47/2445 198/415 |
| 8,210,341 B2 * | 7/2012 | Marshall | ................ | B65G 47/66 198/600 |
| 8,978,871 B1 * | 3/2015 | Guider | ................... | B65G 67/08 198/456 |
| 2004/0065524 A1* | 4/2004 | Flood | ..................... | B65G 47/31 198/370.01 |
| 2010/0135704 A1* | 6/2010 | Mori | .................. | G03G 15/1685 399/313 |
| 2013/0105284 A1* | 5/2013 | Hagmaier | ............... | B65G 15/02 198/837 |
| 2013/0118864 A1* | 5/2013 | Mallaghan | ................ | B64F 1/32 198/602 |

* cited by examiner

*Primary Examiner* — Thomas Randazzo
(74) *Attorney, Agent, or Firm* — Thomas| Horstemeyer

(57) ABSTRACT

Disclosed are various embodiments for a roller cover that can be installed in a conveyor system that includes a conveyor. The roller cover is positioned over a passive roller of the conveyor system. The conveyor transports the item. The speed of the item is reduced using the roller cover.

20 Claims, 4 Drawing Sheets

CONVEYOR SYSTEM

CROSS REFERENCE TO RELATED APPLICATION

This application is a continuation of and claims priority to U.S. patent application Ser. No. 13/899,865, titled "Conveyor System," and filed on May 22, 2013, which is incorporated herein by reference in its entirety.

BACKGROUND

An item can be loaded into a truck and shipped to a fulfillment center. Upon arrival of the item at a receiving area of the fulfillment center, the item is unloaded from the truck and entered into the fulfillment center for storage. A conveyor system can be used to move the item from the truck and into the fulfillment center. Additionally, one or more conveyor systems can be used to move the item within the fulfillment center. Upon the item being sold, for example, workers at the fulfillment center may prepare the item to be shipped to a recipient. For example, the item can be placed into a suitable shipping container, such as a cardboard box, and then loaded onto another truck that delivers the item to the recipient of the sale. A conveyor system can also be used to load the outgoing item into the truck.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a conveyor system that facilitates the movement of items carried by the conveyor system. As a non-limiting example, a conveyor system may be used in the loading dock of a fulfillment center to transport items from the loading dock to a truck. For example, an item can be placed on a conveyor that moves the item towards the destination end of the conveyor system. At the destination end of the conveyor system, there may be passive rollers, where the item can rest prior to the item being manually loaded into the truck.

However, an item riding on the conveyor can gain sufficient speed and momentum to travel from the conveyor to the passive rollers without coming to a stop on the rollers. For example, after traveling along the conveyor to the passive rollers, the item may travel over the passive rollers and fall off the destination end of the conveyor system that is adjacent to the passive rollers. Workers may be injured by an item falling from the destination end of the conveyor system. Additionally, by falling off the conveyor system, the item or equipment may be damaged.

In accordance with various embodiments of the present disclosure, a roller cover is positioned over and/or adjacent to one or more of the passive rollers. An item on the conveyor system travels along the conveyor, to one or more passive rollers, and then to the roller cover that is positioned over one or more other passive rollers. Due to friction between the item and the roller cover, the travel of the item is restricted along the roller cover. As such, the roller cover may stop the item before it would otherwise fall off the conveyor system. Thus, the roller cover can reduce injury to workers and damage to items and equipment.

In the following discussion, a general description of the system and its components is provided, followed by a discussion of the operation of the same.

Figure 1:
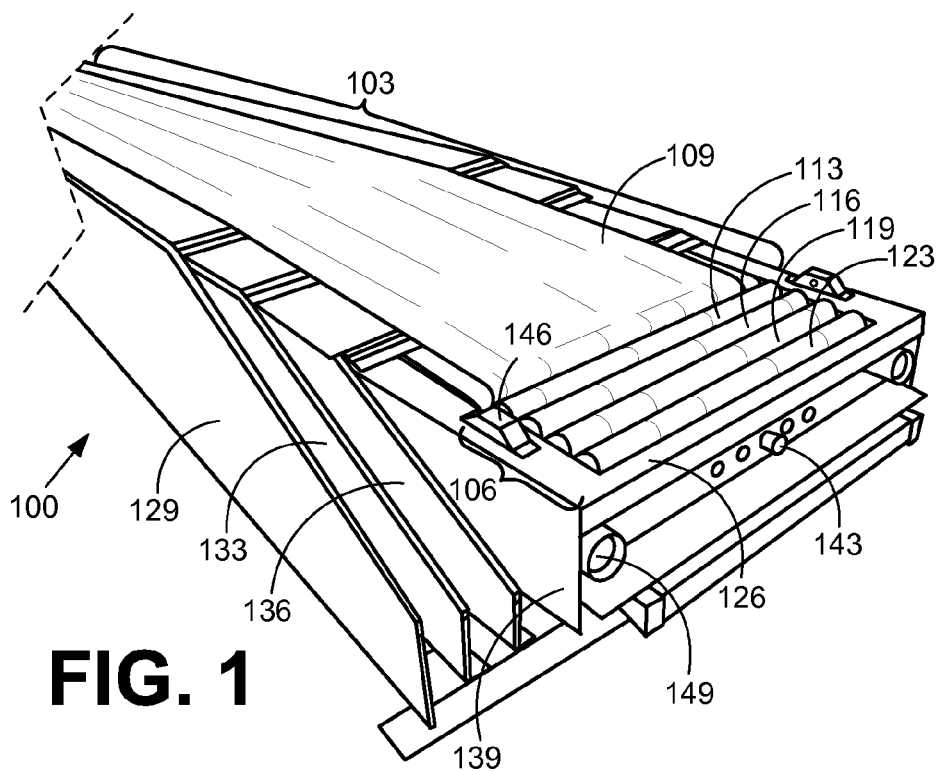
FIGS. 1-2 are drawings of examples of a conveyor system according to various embodiments of the present disclosure.

With reference to FIG. 1, shown is a non-limiting example of a conveyor system 100 according to various embodiments of the present disclosure. The conveyor system 100 can move items (not shown), such as packaged or unpackaged products, goods, or any other type of object that is suitable for transport by the conveyor system 100. The conveyor system 100 is used to transport items into, within, and/or out of an environment. The conveyor system 100 in the embodiment shown in FIG. 1 can be used, for example, at a loading or unloading dock in a fulfillment center. For instance, the conveyor system 100 in the embodiment shown in FIG. 1 can be used to load and/or unload items in a truck or a trailer.

In alternative embodiments, a conveyor system 100 can be located at a manufacturing facility, a warehouse, an airport, a shopping center, or in any other type of environment where it is desirable to transport items from one location to another location. For example, a conveyor system 100 may be located at a retail environment where it is used to move items, such as groceries, at a point of sale station. As another example, a conveyor system 100 may be used to transport luggage into and/or out of inspection systems, airplanes, and/or buildings at the airport. As another non-limiting example, a conveyor system 100 can be used in a manufacturing environment to transport an item being manufactured from one manufacturing station to another manufacturing station. In further embodiments, a conveyor system 100 may be located in a warehouse for transporting items between various storage locations and/or processing stations, for example.

In the embodiment shown in FIG. 1, the conveyor system 100 includes a driven conveyor section 103 and a passive conveyor section 106. The driven conveyor section 103 is representative of multiple driven conveyor sections 103 that can be used in a conveyor system 100 according to various embodiments. The driven conveyor section 103 is a portion of the conveyor system 100 that uses supplied drive power to transport an item. For example, the driven conveyor section 103 shown in FIG. 1 includes a conveyor belt 109. The conveyor system 100 uses power supplied by an external source, such as a drive motor, to move the conveyor belt 109 and thus an item that can be located on the conveyor belt 109. In alternative embodiments, the driven conveyor section 103 may include a track, a powered roller, a vibrating table, or any other type of conveyor that uses a power drive.

The passive conveyor section 106 is representative of multiple passive conveyor sections 106 that may be used in the conveyor system 100 according to various embodiments. The passive conveyor section 106 is a portion of the conveyor system 100 that facilitates the movement of an item without the use of a power drive. Such a passive conveyor section 106 may use gravity to facilitate the transportation of an item. For example, according to various embodiments, the passive conveyor section 106 can include, for example but not limited to, a roller, a table, a chute, or any other type of conveyor element that transports items without the use of a power drive. An item can be moved onto the passive conveyor section 106 to, for example, await a worker manually moving the item.

The passive conveyor section 106 in the embodiment shown in FIG. 1 includes multiple rollers. In particular, the passive conveyor section 106 includes a first roller 113, a second roller 116, a third roller 119, and a fourth roller 123. The first roller 113 is located proximate to the end of the driven conveyor section 103, and the fourth roller 123 is located proximate to a ledge 126 of the conveyor system 100. The second roller 116 and the third roller 119 are located between the first roller 113 and the fourth roller 123, as shown in FIG. 1.

The first roller 113, the second roller 116, the third roller 119, and the fourth roller 123 facilitate the movement of items along the passive conveyor section 106. In this regard, the first roller 113, the second roller 116, the third roller 119, and the fourth roller 123 can rotate freely about their respective axes as an item moves along the passive conveyor section 106. In alternative embodiments, the first roller 113, the second roller 116, the third roller 119, and/or the fourth roller 123 may comprise, for example, a respective row of multiple wheels that can rotate about their respective axes.

The conveyor system 100 in the embodiment shown in FIG. 1 is a telescopic conveyor system. In this regard, one or more portions of the conveyor system 100 can extend and retract in order to adjust the distance that the conveyor system 100 can transport items. For example, the conveyor system 100 shown in FIG. 1 includes a base 129, a first extension 133, a second extension 136, and/or a third extension 139. The base 129 can be fastened to, for example, the floor, a cart used to move the conveyor system 100, or any other suitable support structure.

The base 129, the first extension 133, the second extension 136, and/or the third extension 139 may provide support for the conveyor belt 109 and items that ride on the conveyor belt 109. The first extension 133, the second extension 136, and the third extension 139 can also extend and retract with respect to the base 129 and/or with respect to each other. As such, the distance that the conveyor belt 109 can transport items may be adjusted by extending and/or retracting one or more of the first extension 133, the second extension 136, and/or the third extension 139.

The conveyor system 100 shown in FIG. 1 also includes one or more user controls 143, one or more sensors 146, one or more lights 149, and/or other components that are not discussed in detail herein, as they are not necessary for an understanding of embodiments of the disclosure. The user controls 143 facilitate a worker controlling the conveyor system 100. For example, the user controls 143 may be used to adjust the speed of the conveyor belt 109, the incline of the conveyor belt 109, the positions of the first extension 133, the second extension 136, and the third extension 139, and/or other aspects of the conveyor system 100.

The sensor 146 may detect whether an item is located on the passive conveyor section 106. In response to detecting that an item is on the passive conveyor section 106, the sensor 146 may cause the conveyor belt 109 to stop in order to prevent additional items accumulating on the passive conveyor section 106 and pushing the item off of the ledge 126 of the conveyor system 100.

The light 149 can provide illumination for workers that are in proximity to the conveyor system 100. For example, if the third extension 139 has been extended into a trailer of a truck, the light 149 may illuminate the interior of the trailer to facilitate the loading and/or unloading of items from the trailer by workers.

Next, a general description of the operation of the various components of the conveyor system 100 is provided. To begin, is it assumed that the first extension 133, the second extension 136, and the third extension 139 are set to their desired positions. Additionally, it is assumed that the conveyor system 100 is powered up and that the conveyor belt 109 of the driven conveyor section 103 is moving.

An item can be positioned on the conveyor belt 109. To this end, a person or a robotic arm, for example, can place the item on the conveyor belt 109. Once the item has been positioned on the conveyor belt 109, the item rides on the conveyor belt 109 towards the passive conveyor section 106.

Upon the item reaching the end of the conveyor belt 109, the item transitions from the conveyor belt 109 to the first roller 113. Due to the item making contact with the first roller 113, the first roller 113 rotates about its axis, thereby facilitating movement of the item across the passive conveyor section 106. Additionally, a portion of the item may still be on the conveyor belt 109. As such, the conveyor belt 109 may push the item further onto the passive conveyor section 106. The item then makes contact with the second roller 116, the third roller 119, and/or the fourth roller 123 as it continues moving along the passive conveyor section 106 towards the ledge 126 of the conveyor system 100. In alternative embodiments, the item may travel across more or fewer rollers.

The sensor 146 may detect that the item is located on or near the passive conveyor section 106 and cause the conveyor belt 109 to stop. In some situations, the item stops while on the first roller 113, the second roller 116, the third roller 119, the fourth roller 123, and/or the ledge 126.

However, in some cases, the momentum of the item causes the item to continue moving along the passive conveyor section 106, over the ledge 126, and off the conveyor system 100. Additionally or alternatively, the momentum of another item that is on the conveyor belt 109 and/or the passive conveyor section 106 may cause the other item to bump into the item, thereby causing the item to travel over the ledge 126 and fall off the conveyor system 100. The item may become damaged as a result of the fall off of the conveyor system 100. Additionally, the falling item may injure a worker and/or cause damage to equipment near the conveyor system 100.

Figure 2:
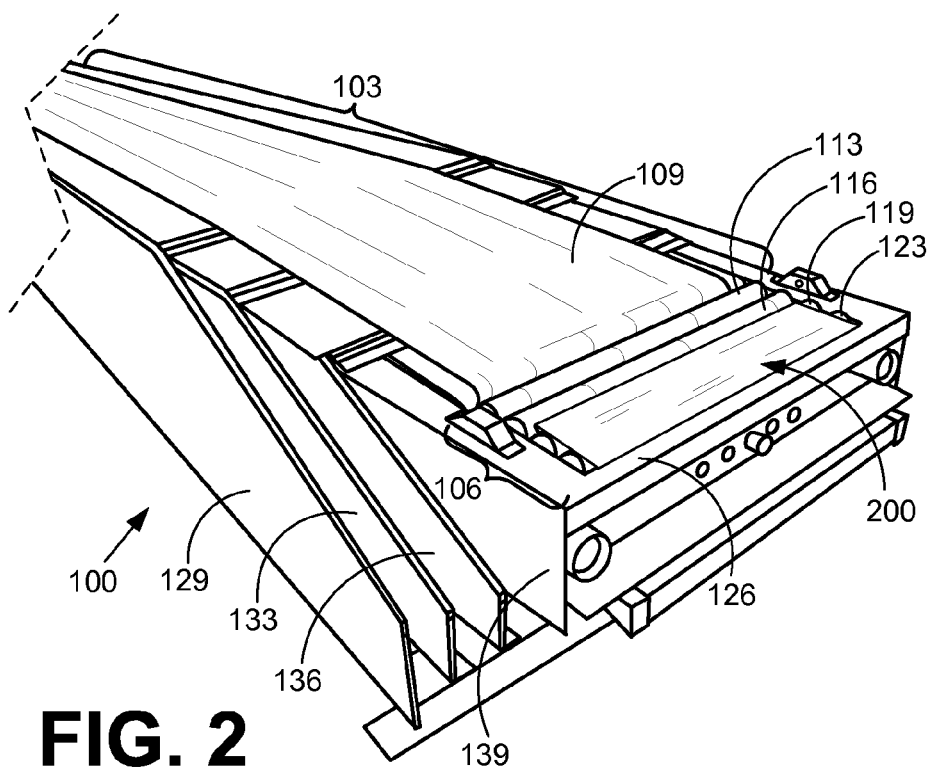

With reference to FIG. 2, shown is the conveyor system 100 equipped with a roller cover 200 according to various embodiments of the present disclosure. As will be described in more detail below, the roller cover 200 can be installed over and/or adjacent to the first roller 113, the second roller 116, the third roller 119, and/or the fourth roller 123 to restrict an item from making contact with at least a portion of the first roller 113, the second roller 116, the third roller 119, and/or the fourth roller 123. When the roller cover 200 is installed, the item makes contact with the roller cover 200 as it moves across the passive conveyor section 106. As a result, friction between the item and the roller cover 200 restricts the movement of the item along the passive conveyor section 106. Thus, the item may stop on the roller cover 200 prior to the item otherwise traveling over the ledge 126 and falling off of the conveyor system 100.

Figure 3:
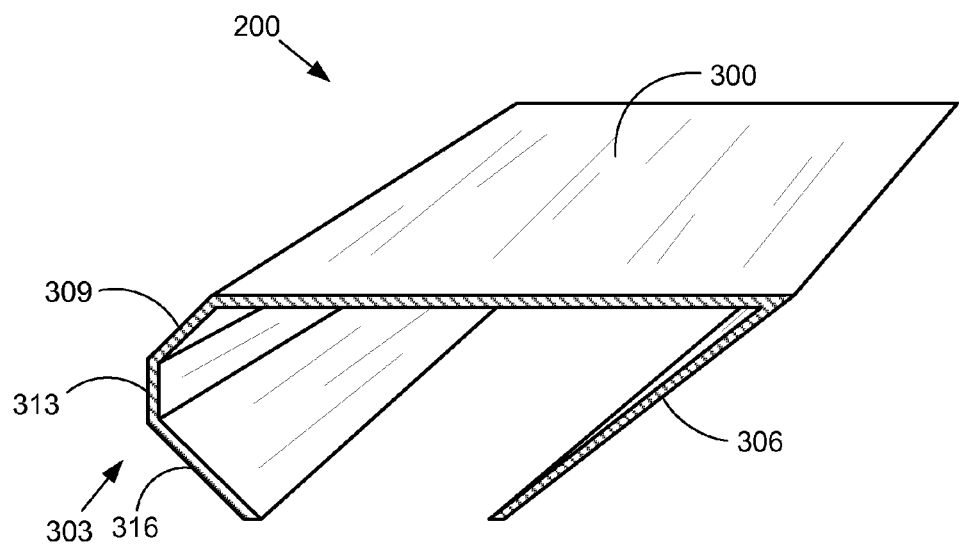
FIGS. 3-4 are drawings of an example of a roller cover for the conveyor system of FIGS. 1-2 according to various embodiments of the present disclosure.

With reference to FIG. 3, shown is the roller cover 200 according to various embodiments of the present disclosure.

The roller cover 200 may comprise, for example, aluminum, steel, plastic, and/or any other suitable type of material that increases the friction between an item and the passive conveyor section 106. In the embodiment shown in FIG. 3, the roller cover 200 comprises a plate 300, a first fin 303 that extends from a first side of the plate 300, and second fin 306 that extends from a second side of the plate 300. The plate 300 is configured to be positioned over one or more rollers, such as the first roller 113 (FIG. 1), the second roller 116 (FIG. 1), the third roller 119 (FIG. 1), and/or the fourth roller 123 (FIG. 1). Additionally, the outer surface of the plate 300 is configured to make contact with an item transported using the conveyor system 100 (FIG. 1).

According to various embodiments, the surface of the plate 300 that contacts an item may comprise various features that increase the friction between the plate 300 and the item. For example, the surface of the plate 300 may comprise protrusions, such as studs, ribs, or other types of members that are configured to increase the amount of friction between the plate 300 and an item transported by the conveyor system 100. Additionally or alternatively, the plate 300 may comprise a coating configured to increase the amount of friction between the plate 300 and an item. For instance, a rubber coating, a sandpaper coating, and/or any other type of coating may be disposed on the exterior surface of the plate 300. Additionally, the concentration of the friction coating or feature that is disposed on the plate 300 may vary along various points of the plate 300. For example, the concentration of protrusions may increase as the distance from the first fin 303 increases. Thus, the plate 300 can comprise a friction gradient for which the friction between the plate 300 and an item increases as the distance to the ledge 126 of the conveyor system 100 decreases.

The first fin 303 is configured to insert between a roller and another element in the conveyor system 100. For example, the first fin 303 according to various embodiments may insert between the first roller 113 and the end of the conveyor belt 109 (FIG. 1), between the first roller 113 and the second roller 116, between the second roller 116 and the third roller 119, or the third roller 119 and the fourth roller 123. By inserting between a roller and another element in the conveyor system 100, the first fin 303 may restrict the roller cover 200 such that the plate 300 is retained in positioned over one or more of the rollers.

The first fin 303 in the embodiment shown in FIG. 3 includes a first section 309, a second section 313, and a third section 316. The first section 309, the second section 313, and the third section 316 are respectively oriented so that the first fin 303 forms a shape that can receive a roller, such as the first roller 113, the second roller 116, the third roller 119, or the fourth roller 123. As such, a roller can be nested within the space between the first fin 303 and the plate 300 when the roller cover 200 is installed in the conveyor system 100.

Additionally, the first section 309 of the first fin 303 forms a ramp that may facilitate an item moving onto the plate 300. In this regard, the first section 309 is exposed to and may contact an item that travels from the second roller 116 onto the roller cover 200. Because of the orientation of the first section 309 with respect to the second roller 116 and the plate 300, the first section 309 can guide the item onto the plate 300 of the roller cover 200.

The second fin 306 in the embodiment shown in FIG. 3 is also configured to insert between a roller and another element in the conveyor system 100. For example, the second fin 306 may insert between the first roller 113 and the second roller 116, between the second roller 116 and the third roller 119, between the third roller 119 and the fourth roller 123, or between the fourth roller 123 and the ledge 126 (FIG. 1) of the conveyor system 100. By inserting between a roller and another element in the conveyor system 100, the second fin 306 may restrict the roller cover 200 such that the plate 300 is retained in position over one or more of the rollers.

The second fin 306 in the embodiment shown in FIG. 3 is angled towards the first fin 303. With the second fin 306 oriented towards the first fin 303, the area between the second fin 306 and the plate 300 forms a space that can receive a roller, such as the first roller 113, the second roller 116, the third roller 119, or the fourth roller 123. As such, a roller can be nested within the space between the second fin 306 and the plate 300 when the roller cover 200 is installed in the conveyor system 100.

Figure 4:
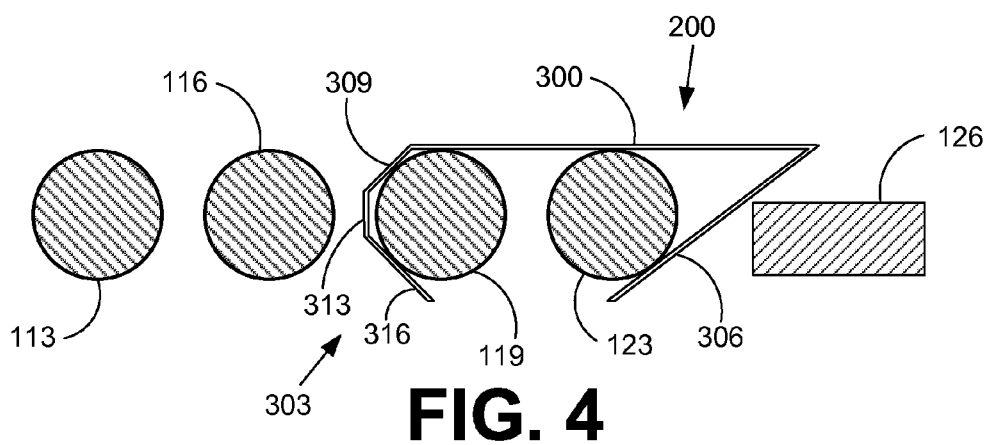

With reference to FIG. 4, shown is a cross-sectional view of an example of the roller cover 200 installed in the conveyor system 100 (FIG. 1) according to various embodiments of the present disclosure. In the embodiment shown in FIG. 4, the first fin 303 has been inserted between the second roller 116, and the second fin 306 has been inserted between the fourth roller 123 and the ledge 126.

As shown, the third roller 119 is nested within the space between the first fin 303 and the plate 300, and the fourth roller 123 is nested within the space between the second fin 306 and the plate 300. In this position, the first fin 303 in conjunction with the plate 300 clamp onto the third roller 119. Similarly, the second fin 306 in conjunction with the plate 300 clamp onto the fourth roller 123. Accordingly, the roller cover 200 is retained in position over the third roller 119 and the fourth roller 123.

To remove the roller cover 200 from the conveyor system 100, the roller cover 200 can be pulled away from the third roller 119 and the fourth roller 123. As the plate 300 moves away from the second roller 116 and the third roller 119, the first fin 303 and the second fin 306 flex away from the plate 300. As the plate 300 is moved further away from the third roller 119 and the fourth roller 123, the first fin 303 and the second fin 306 become separated from the third roller 119 and the fourth roller 123.

Thus, the roller cover 200 can be installed on a pre-existing conveyor system 100 without the use of bolts, adhesives, or any other type of fastener. Additionally, the roller cover 200 can be removed merely by pulling the roller cover 200 away from the conveyor system 100. Thus, the roller cover 200 can be installed and removed without making a permanent modification to the conveyor system 100.

Figure 5:
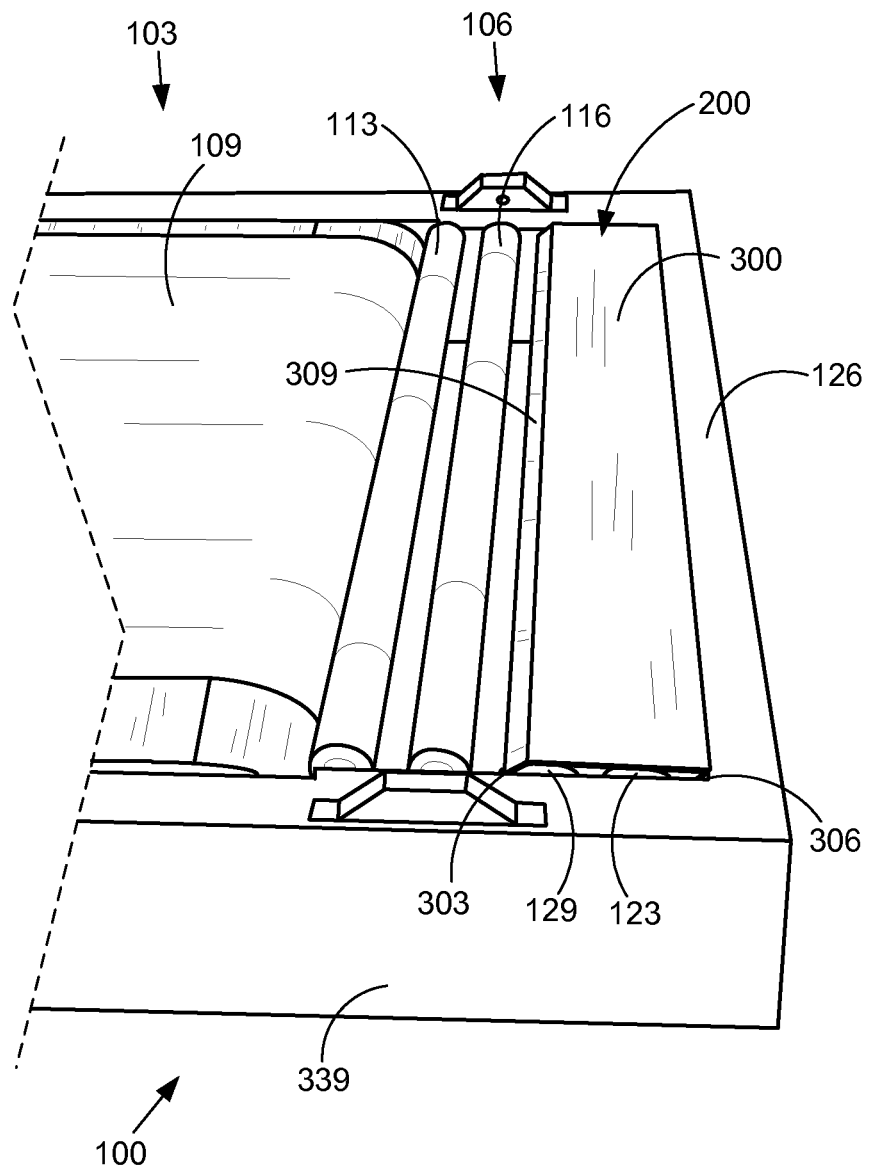
FIG. 5 is another drawing of the conveyor system of FIGS. 1-2 according to various embodiments of the present disclosure.

With reference to FIG. 5, shown is an example of the conveyor system 100 with the roller cover 200 installed. A general description of the operation of the conveyor system 100 with the roller cover 200 installed follows. In the following discussion, is it assumed that the conveyor system 100 is powered up and that the conveyor belt 109 is moving. Additionally, it is assumed that an item has been placed on the conveyor belt 109 and is moving towards the passive conveyor section 106.

Upon the item reaching the end of the conveyor belt 109, the item transitions from the conveyor belt 109 to the first roller 113. Due to the item making contact with the first roller 113, the first roller 113 rotates about its axis, thereby facilitating movement of the item across the passive conveyor section 106. Additionally, a portion of the item may still be on the conveyor belt 109. Thus, the conveyor belt 109 may push the item further onto the passive conveyor section 106. Thereafter, item makes contact with the second roller 116, which rolls to facilitate movement of the item across the passive conveyor section 106.

The item then makes contact with the roller cover 200. In particular, the item contacts the first section 309 of the first fin 303. Because of the slope of the first section 309, the first section 309 acts as a ramp to facilitate the item moving onto the plate 300 of the roller cover 200. Additionally, because the slope of the first section 309 of the first fin 303 acts as a ramp for the item, the item may not tumble or tip over upon contacting the roller cover 200.

The item may continue to move onto the plate 300 of the roller cover 200 and to progress towards the ledge 126 of the conveyor system 100. Due to the friction between the item and the plate 300 of the roller cover 200, the speed at which the item is traveling may be reduced. Eventually, the friction between the plate 300 and the item may be sufficient to cause the item to come to a stop on the plate 300 and/or the ledge 126. Thus, the roller cover 200 restricts the movement of the item on the passive conveyor section 106 of the conveyor system 100. Additionally, the roller cover 200 may restrict the item from traveling over the ledge 126 and thus off of the conveyor system 100.

Figure 6:
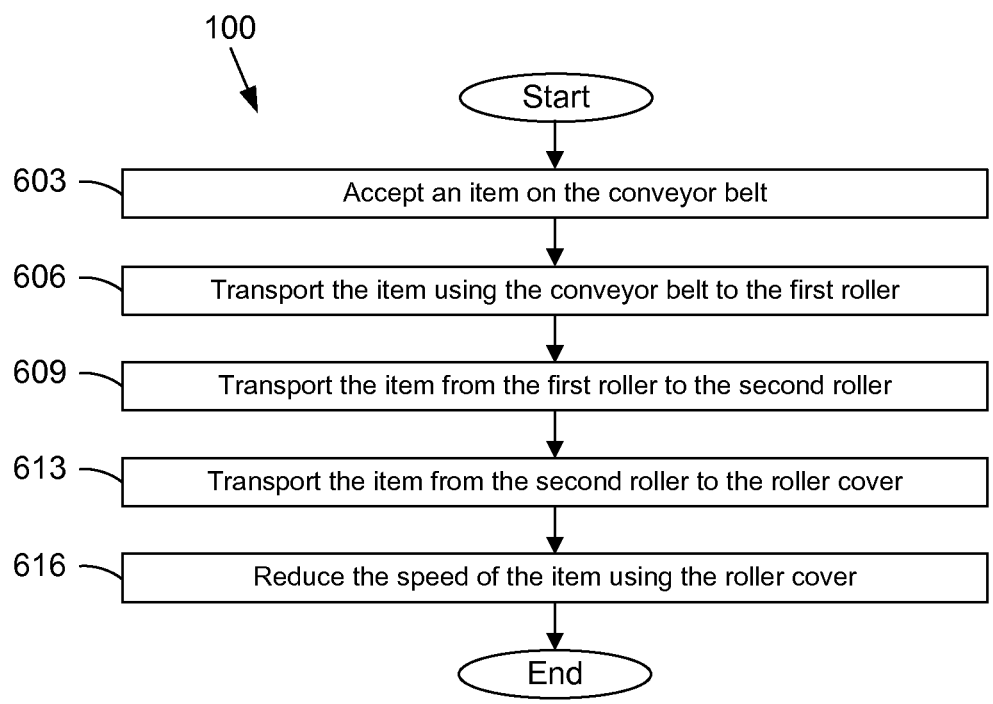
FIG. 6 is a flowchart illustrating an example of functionality implemented by the conveyor system of FIGS. 1-2 according to various embodiments of the present disclosure.

With reference to FIG. 6, shown is a flowchart that represents an example of the operation of the conveyor system 100 according to various embodiments of the present disclosure. It is understood that the flowchart of FIG. 6 provides merely an example among others of the operation of the conveyor system 100 as described herein. As an alternative, the flowchart of FIG. 6 may be viewed as depicting an example of steps of a method performed by the conveyor system 100 according to one or more embodiments.

Beginning at box 603, the conveyor system 100 accepts an item on the conveyor belt 109 (FIG. 2). The item may be positioned on the conveyor belt 109 by a worker or a robotic arm, for example. As shown in box 606, the conveyor belt 109 is used to transport the item to the first roller 113 (FIG. 2). When the item arrives at the first roller 113, the first roller 113 may rotate about its axis to facilitate moving the item across the passive conveyor section 106. As indicated in box 609, the item is then transported from the first roller 113 to the second roller 116. The second roller 116 may also rotate about its axis to facilitate the movement of the item along the passive conveyor section 106.

Moving to box 613, the conveyor system 100 then transports the item from the second roller 116 to the roller cover 200 (FIG. 2). The first section 309 (FIG. 4) of the first fin 303 (FIG. 4) of the roller cover 200 may act as a ramp and guide the item onto the plate 300 (FIG. 4) of the roller cover 200. As shown at box 616, the conveyor system 100 uses the roller cover 200 to reduce the speed of the item. In particular, the friction between the roller cover 200 and the item causes the speed of the item to reduce. Thereafter, the process ends.

Although the flowchart of FIG. 6 shows a specific order of execution, it is understood that the order of execution may differ from that which is depicted. For example, the order of execution of two or more boxes in FIG. 6 may be scrambled relative to the order shown. Also, two or more boxes shown in succession in FIG. 6 may be executed concurrently or with partial concurrence. Further, in some embodiments, one or more of the blocks shown in FIG. 6 may be skipped or omitted. It is understood that all such variations are within the scope of the present disclosure.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A conveyor system, comprising:
   a driven conveyor section comprising a conveyor, the conveyor being configured to transport an item to an end of the driven conveyor section;
   a passive conveyor section comprising a first roller and a second roller, the first roller being positioned adjacent to the end of the driven conveyor section, the first roller being configured to facilitate the item being transported along at least a portion of the passive conveyor section; and
   a roller cover positioned over the second roller, the roller cover being configured to prevent the item from contacting at least a portion of the second roller, the roller cover being configured to restrict a movement of the item along the passive conveyor section.

2. The conveyor system of claim 1, wherein:
   the passive conveyor section further comprises a third roller; and
   the roller cover is positioned over the third roller so that the roller cover is configured to prevent the item from contacting at least a portion of the third roller.

3. The conveyor system of claim 1, wherein the roller cover clamps onto the passive conveyor section.

4. The conveyor system of claim 3, wherein the roller cover comprises a fin that facilitates the roller cover clamping onto the passive conveyor section.

5. The conveyor system of claim 1, wherein the conveyor system is a telescopic conveyor system.

6. The conveyor system of claim 1, wherein the roller cover comprises a plurality of protrusions that extend from a surface of the roller cover.

7. The conveyor system of claim 1, wherein a surface of the roller cover comprises a coating having a friction gradient that varies along at least a portion of the surface.

8. A conveyor system, comprising:
   a conveyor comprising a passive roller, the conveyor configured to facilitate an item being moved along at least a portion of the conveyor; and
   a roller cover positioned over the passive roller, the roller cover comprising a plate configured to prevent the item from contacting at least a portion of the passive roller to thereby restrict the item from moving.

9. The conveyor system of claim 8, wherein a surface of the plate comprises a coating having a friction gradient that varies along at least a portion of the surface.

10. The conveyor system of claim 8, wherein the roller cover is configured to clamp onto the passive roller.

11. The conveyor system of claim 10, wherein the roller cover comprises a fin that facilitates the roller cover clamping onto the passive roller.

12. The conveyor system of claim 8, wherein the plate comprises a plurality of protrusions extending from the plate.

13. The conveyor system of claim 8, wherein:
   the conveyor further comprises an additional passive roller; and
   the roller cover is positioned over the passive roller and the additional passive roller.

14. The conveyor system of claim 8, wherein the roller cover further comprises a ramp that is configured to facilitate the item being moved onto the plate.

15. A method, comprising:
positioning a roller cover over a passive roller of a conveyor system, the conveyor system comprising a conveyor;
transporting an item using the conveyor of the conveyor system; and
reducing a speed of the item using the roller cover.

16. The method of claim 15, further comprising attaching the roller cover to the passive roller.

17. The method of claim 15, wherein positioning the roller cover over the passive roller comprises positioning the roller cover over a subset of a plurality of passive rollers of the conveyor system.

18. The method of claim 15, wherein positioning the roller cover over the passive roller comprises disposing the roller cover directly on the passive roller.

19. The method of claim 15, further comprising removing the roller cover from the conveyor system to facilitate the passive roller being used to transport an additional item.

20. The method of claim 15, wherein the roller cover further comprises a fin, and wherein the method further comprises inserting the fin between the passive roller and an additional passive roller.

\* \* \* \* \*